United States Patent [19]
Kabayashi

[11] Patent Number: 4,859,081
[45] Date of Patent: Aug. 22, 1989

[54] SURFACE TEMPERATURE SENSOR

[75] Inventor: Seishiro Kabayashi, Tokyo, Japan

[73] Assignee: Anritsu Meter Co., Ltd., Tokyo, Japan

[21] Appl. No.: 151,668

[22] Filed: Feb. 2, 1988

[30] Foreign Application Priority Data

Aug. 4, 1987 [JP] Japan .................. 62-193684

[51] Int. Cl.[4] .......................................... G01K 7/04
[52] U.S. Cl. ................... 374/179; 374/153; 374/208; 136/221
[58] Field of Search ............... 374/208, 153, 154, 179; 136/221, 225, 242

[56] References Cited

U.S. PATENT DOCUMENTS

| 1,883,444 | 10/1932 | Albert | 374/153 |
| 2,022,515 | 11/1935 | Orchard | 136/221 |
| 3,283,580 | 11/1966 | Nanigian et al. | 136/221 |
| 3,395,050 | 7/1968 | Senbokuya | 136/221 |
| 3,573,995 | 4/1971 | Senbokuya | 374/179 |
| 4,091,673 | 5/1978 | Tamura et al. | 374/179 |
| 4,242,148 | 12/1980 | Remmert | 374/179 |
| 4,279,154 | 7/1981 | Nakamura | 374/179 |

FOREIGN PATENT DOCUMENTS 0074432 6/1980 Japan .................. 136/221
0304556 1/1929 United Kingdom ......... 374/179

Primary Examiner—William A. Cuchlinski, Jr.
Assistant Examiner—Thomas B. Will
Attorney, Agent, or Firm—Armstrong, Nikaido, Marmelstein Kubovcik & Murray

[57] ABSTRACT

A surface temperature sensor is disclosed, which comprises a contact member and a position restricting portion for guiding the contact member, of which the contact member comprises a contact surface formed of an elastic material and having a generally C-shaped or $\Omega$-shaped section, a first deformable portion connected to and extending from respective ends of the contact surface, a second deformable portion connected to and inwardly extending from respective ends of the first deformable portions along the contact surface, and a support portion formed at respective free ends of the second deformable portions and pivotally supported about pins, and of which the position restricting portion has ends thereof located in the vicinity of points at which respective first deformable portion and the second deformable portion are connected to each other.

6 Claims, 5 Drawing Sheets

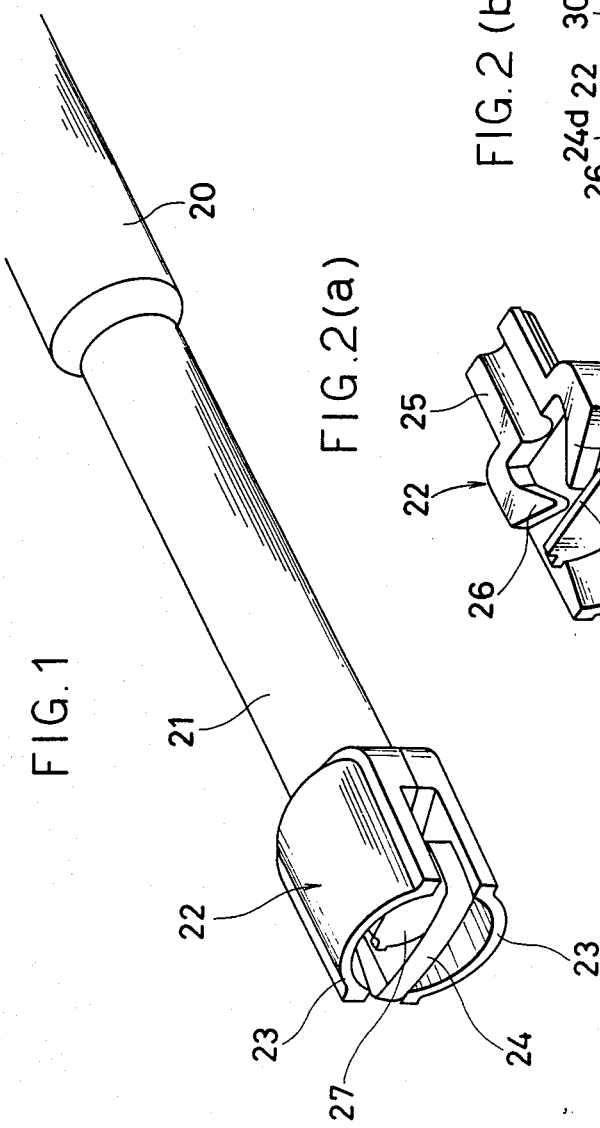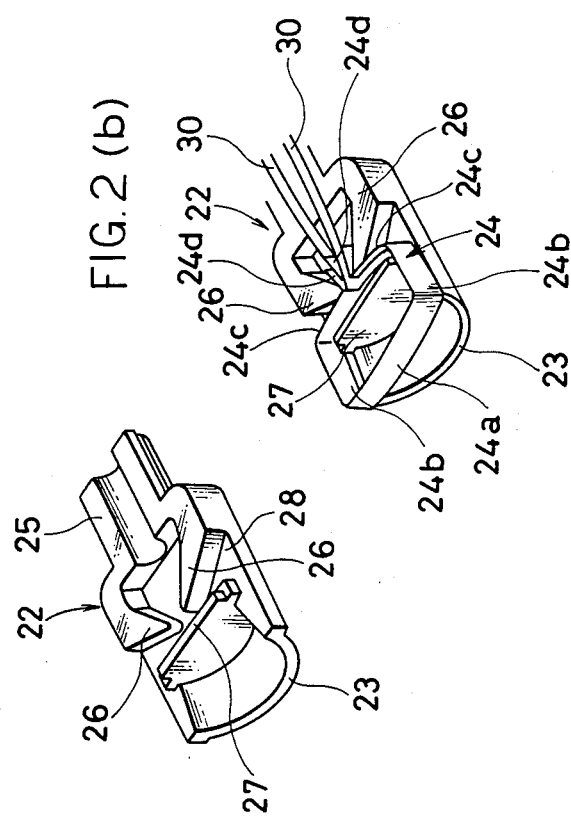

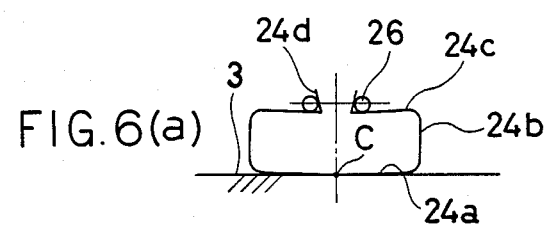
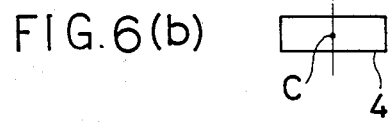
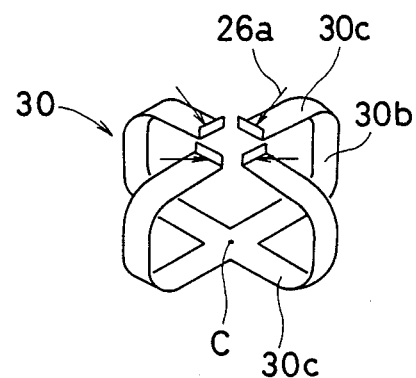
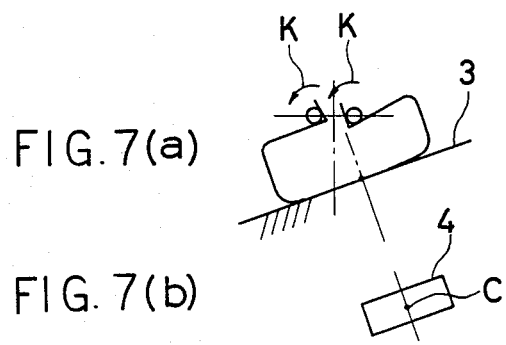
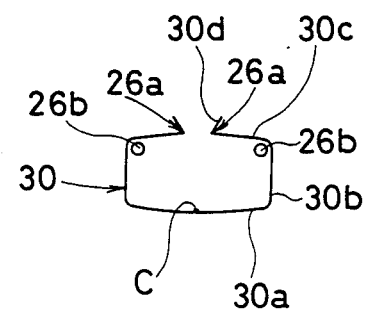
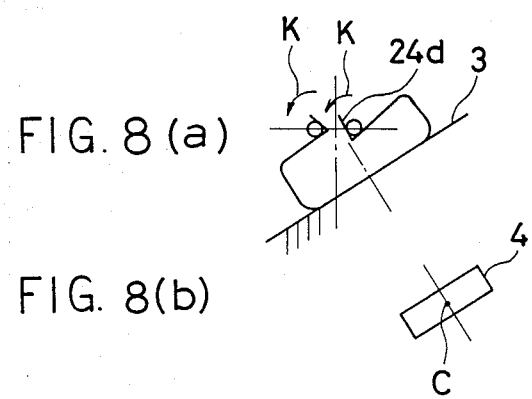
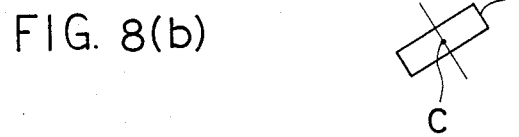

PRIOR ART
FIG.10(a)
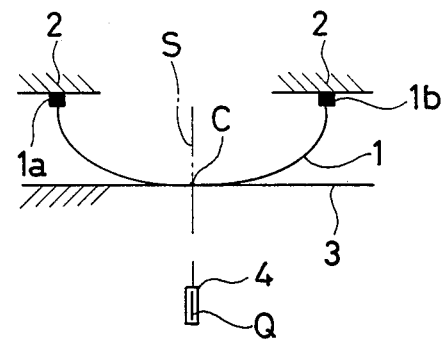
FIG.10(b)
FIG.11(a)
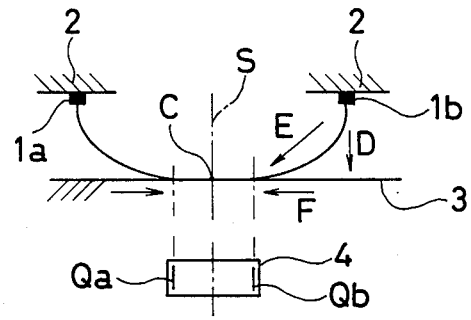
FIG.11(b)
FIG.12(a)
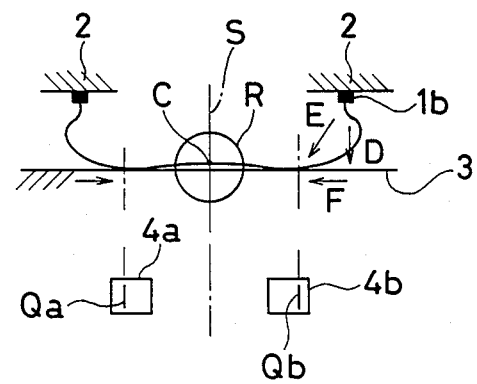
FIG.12(b)
FIG.12(c)
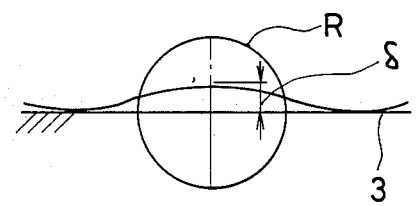

PRIOR ART
FIG. 13(a)
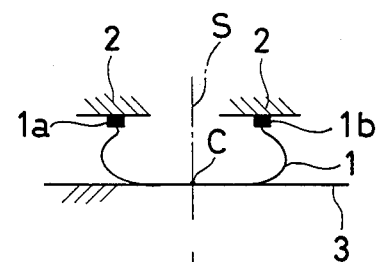
FIG. 13(b)
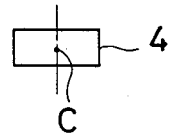
FIG. 14(a)
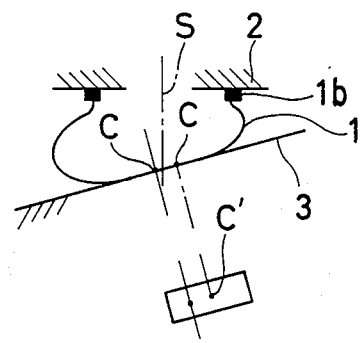
FIG. 14(b)
FIG. 15(a)
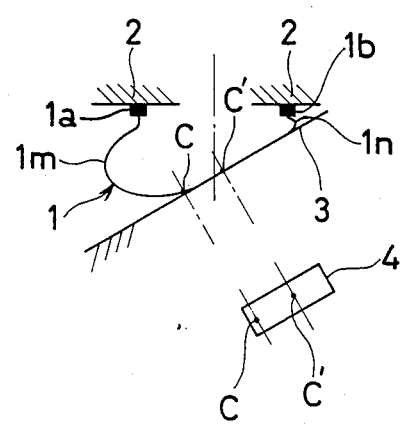
FIG. 15(b)
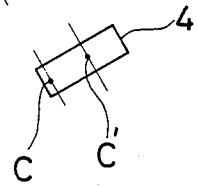

SURFACE TEMPERATURE SENSOR

BACKGROUND OF THE INVENTION

This invention relates to an improvement in a contacting type surface temperature sensor adapted to be brought into contact with a surface of a solid to measure the temperature thereof, and more particularly, to a surface temperature sensor which is capable of minimizing a measurement error even when the posture of the sensor with respect to the surface, the temperature of which is to be measured, of a solid varies to a diagonal state, i.e., even when the angle between an object surface of the solid and the sensor contacting the same surface varies to an angle smaller than 90°, and which has a superior durability.

A contacting type surface temperature sensor utilizing a thermocouple has a thin-belt-like resilient contact member. When this contact member consists of a spring type thermocouple plate, or a thin plate spring with a thermoelement, such as a thermocouple or a thermistor, supported on the central portion thereof, the contact member is fixed at its both ends to the free end portion of a support member so that the contact member projects semicircularly in side elevation, to thereby form a temperature measuring portion of the sensor.

When this surface temperature sensor is used, the intermediate portion of the semicircular contact member is brought into contact with the surface of a solid the temperature of which is to be measured, and then pressed lightly against the surface to slightly flatten the semicircular portion of the contact member, whereby a part (contact surface) of the contact member is engaged closely with the object surface of the solid. This contact member is formed so as to enable itself to reliably contact an object surface, the quantity of the heat, which is transferred between the contact member and an object surface when the contact member is engaged with the object surface to be minimized, and the temperature drop at the object surface at such a time to be thereby minimized. The construction of this surface temperature sensor is determined with consideration given to, especially, a solid having a small thermal capacity.

A method of making the contact member extremely thin so as to reduce the thermal capacity thereof is employed as means for enabling the contact member to be pressed against the object surface so that the contact member can thermally sufficiently contact the object surface and the occurrence of transfer of heat between the contact member and object surface can be minimized. However, when the thickness of the contact member is reduced to such an extent, the pressing force thereof to be applied to an object surface decreases, so that the contact member is not fitted accurately along the object surface.

In order that the contact member can reliably contact the object surface of a solid, the thickness of the contact member is increased to increase the pressing force thereof. However, if the thickness of the contact member is increased, the thermal capacity thereof increases. Therefore, when the generation of heat is to be measured in an object solid having a small thermal capacity and a low pressure resistance, for example, a semiconductor device, such a contact member is not suitably used. A surface temperature sensor in which a contact member is supported on a metallic auxiliary spring with a view to eliminating these problems is proposed as disclosed in, for example, Japanese patent publication No. 46-25795.

This surface temperature sensor "is provided with a thermocouple element joined to a thin-belt-like resilient thermocouple or a thin thermocouple wire so as to extend to a predetermined shape, and a metallic auxiliary spring means for the thermocouple element, and formed so that, when the temperature of an object surface is measured, the thermocouple element contacting this surface is supported on the metallic spring means in the same temperature region of the thermocouple element and spring means".

The temperature sensor of the above-described construction consists of a thermoelement composed of a thermocouple, and a spring means supporting the thermoelement, and the temperature measuring portion of the sensor has a complicated construction and a comparatively large thermal capacity.

The thermocouple and the spring means supporting it are fixed to a support member. It is necessary that a heat-sensitive portion of the thermoelement be in press-contact with an object surface accurately (closely) in all temperature measuring operations. Therefore, the heat-sensitive portion requires to be engaged with an object surface quietly. This causes the use of the sensor to be restricted. Namely, it is difficult to momentarily measure the temperature of, for example, a moving solid with which the heat-sensitive portion of the sensor cannot be easily engaged.

If the end portions of a contact member are fixed to a support member of the temperature sensor, fatigue of metal occurs at the fixed end portions of the contact member, so that the contact member is bent or broken. Therefore, it can be said that such a temperature sensor has a problem with respect to the mechanical strength as well.

The end portions of the contact member, which are fixed to the support member or the body of the temperature sensor, cause further problems. Namely, since the root portions of the contact member are fixed, the contact member is necessarily deformed to the shape of a cantilever. This causes the degree of freedom of deformation of the spring to decrease, and the contact surface of the contact member cannot accurately and easily engage the surface of an object solid.

Consequently, for example, when the temperature sensor is brought into contact with an object solid in motion to momentarily measure the temperature of the surface thereof, they do not engage with each other excellently, and an error would occur in a detected temperature.

In more detail, when the contact member engages the surface of an object solid, the deformation of the contact surface of the contact member does not progress, for example, from a semicircular shape to an elongated arcuate shape, i.e., the width or area of the contact surface does not gradually increase but, when the deformation of the contact member has progressed to a certain extent, a part of the contact surface thereof floats from the object solid, so that that part of the contact member on which a temperature measuring element which is important for the measurement of the temperature of an object surface is provided, or a hot junction does not accurately contact the object solid.

These problems will be described with reference to illustrations. As shown in FIG. 10(a), both ends 1a and 1b of a contact member 1, which consists of a thin plate of a thermocouple with a hot junction c (or a heat-sensitive portion) provided on the central section of the thin plate, or a thin plate with a heat-sensitive element, such as a thermistor provided on the central portion thereof, or a thin wire type thermocouple, are fixed to a body 2 (or a support member) of a temperature sensor so that the contact member 1 is bent generally to a semicircular shape. The measuring of the temperature of an object solid 3 with this contact member 1 engaged therewith will now be described.

When the central portion of the semicircular contact member 1 fixed at its both ends to the sensor body 2 as shown in FIG. 10(a) is engaged lightly with the object solid 3, the hot junction c and the center of a contact surface 4 shown in FIG. 10(b) agree with each other.

A segment Q on the contact surface 4 represents a stress-concentrated portion occurring when the contact member 1 engages the object solid 3. This means that, when the contact member 1 is deformed slightly, the hot junction c exists on the contact surface 4 with the contact surface area at an insufficiently low level, and that, therefore, an accurate temperature measuring operation cannot be carried out.

When the sensor body 2 is then moved toward the object solid 3 in the direction of an arrow D shown in FIG. 11(a), the width of the contact surface 4 gradually increases as shown in FIG. 11(b). In this stage, the hot junction c is still positioned on the central portion of the contact surface 4, and the contact surface area is sufficiently large, so that the temperature of the object solid can be accurately measured.

The variation (increase) of the area of the contact surface 4 will now be discussed. When the contact member 1 is pressed toward the surface of the object solid 3 in the direction of the arrow D to be engaged therewith, a force shown by an arrow E and directed from the fixed support point 1b to a stress-concentrated portion Qb on the object solid 3 occurs. The force shown by this arrow E is divided into components working in two directions, i.e. a component of the arrow D by which the contact member 1 is pressed toward the object solid 3, and a component of an arrow F by which the contact member 1 is compressed toward the central portion thereof.

A question as to whether the component working in the direction of the arrow F serves to reliably engage the contact member 1 with the surface of the object solid 3 will now be discussed. When the sensor body 2 is brought closer to the object solid 3 so as to deform the contact member 1 as shown in FIG. 12(a), the component of the arrow F works toward the central portion of the contact member 1, so that the central portion floats from the object solid 3 to cause the hot junction c to be separated by a distance δ from the surface of the object solid 3. The details of such a movement of the central portion designated by a circle R in FIG. 12(a) are shown in an enlarged front elevation of the same portion in FIG. 12(c).

When the contact member is in this condition, the contact surface 4 is separated into contact surface portions 4a and 4b as shown in FIG. 12(b). The above-mentioned upward removal of the hot junction c from the surface of the object solid 3 causes an error of a detected temperature, and it is necessary that this phenomenon be prevented.

If the contact member 1 is engaged momentarily with the surface of the object solid 3 as shown in FIG. 12(a), the hot junction c is not heated directly by the object solid 3. Therefore, it is clear that an error of a detected temperature becomes large.

The above is a description of the case where the contact member 1 is engaged in a regular posture (in which the sensor body 2 is applied to the surface of the object solid 3 so that the direction in which a pressing force is applied to the sensor body is at right angles to the surface of the object solid 3) with the surface of the object solid 3. When the sensor body 2 is applied to the surface of the object solid 3 so that the direction of a pressing force applied to the latter is diagonal with respect to the latter, some more problems arise.

FIGS. 13(a), 13(b), 14(a), 14(b), 15(a) and 15(b) illustrate this case. FIGS. 13(a) and 13(b) correspond to FIGS. 11(a) and 11(b), and indicate that the hot junction c (or heat-sensitive portion) is positioned in the central portion of the contact surface 4, and that an error of a detected temperature does not substantially occur.

When the object solid 3 inclines with respect to the body 2 of the temperature sensor, or when the sensor body 2 is engaged inclinedly with the object solid 3, as shown in FIG. 14(a), the heat-sensitive portion c gradually leaves a center line S. As a result, the hot junction c moves toward a corner portion of the contact surface 4 as shown in FIG. 14(b). In this case, the hot junction c is about to leave the contact surface 4, and deviation occurs between a temperature-measuring center c' and the hot junction c.

FIGS. 14(a) and 14(b) show an example of the posture of the contact member 1, which often occurs while the temperature of, for example, a moving object is measured with a contacting type temperature sensor. In this case, the temperature-measuring center c' deviates from the hot junction c, so that a temperature lower than an actual temperature is detected. Namely, an error occurs in a temperature measuring operation in this case.

FIGS. 15(a) and 15(b) show the condition of the sensor body 2 extremely inclined with respect to the object solid 3 with the hot junction c removed or about to be removed from the contact surface 4. In this condition, the accurate transmission of the heat of the object solid to the hot junction c can hardly be expected, so that a considerable error occurs in a detected temperature.

When the sensor body 2 inclines extremely with respect to the object solid 3 as shown in FIG. 15(a), one side portion of the contact member 1 is bent as shown by 1m with a comparatively large radius of curvature, while the other side portion thereof is bent as shown by 1n with a small radius of curvature. When the contact member 1 is bent with a small radius of curvature 1n in this manner, the fixed portion 1b is bent extremely, and large stress occurs therein, so that permanent deformation occurs in the contact member 1. This causes an error in a detected temperature to increase, and the contact member 1 to be finally broken. Moreover, since the hot junction c is moved to an end portion of the contact surface 4, it becomes difficult to measure the temperature of the object surface accurately.

SUMMARY OF THE INVENTION

The present invention has been developed with a view to eliminating the problems with the above-described conventional contacting type temperature sensor. A first object of the present invention is to provide a temperature sensor having a contact member the contact surface of which can be accurately engaged with the surface of an object solid.

In a conventional temperature sensor, the contact surface of the contact member thereof leaves an object solid and floats at the central portion of the former from the latter when the sensor body is pressed against the object solid under a certain condition but such an inconvenience can be eliminated by the present invention.

A second object of the present invention is to provide a temperature sensor having a contact member which is not easily broken at the portions thereof which are in the vicinity of the portions of the same fixed to a support member or a sensor body.

In a conventional temperature sensor, an extremely large deforming force is applied to both end portions, which are fixed to the sensor body, of a contact member. Consequently, permanent deformation occurs in these end portions, or these end portions are bent or broken. These inconveniences can also be eliminated by the present invention.

A third object of the present invention is to provide a temperature sensor having an increased degree of freedom of spring deformation of a contact member, capable of being engaged excellently with an object solid, capable of substantially preventing stress from being concentrated locally in the contact member, and having a high durability.

In a conventional temperature sensor, both ends of a contact member are fixed rigidly to the sensor body, so that a measurement error occurs when the contact member assumes a certain posture while it contacts an object solid or when the contact engages the object solid under a certain condition. Such drawbacks can also be eliminated by the present invention.

A fourth object of the present invention is to provide a temperature sensor having a contact member which is not permanently deformed even when an impact load is imparted thereto, and which has a high durability.

The temperature sensor according to the present invention by which these object can be achieved comprises a generally C-shaped or Ω-shaped contact member consisting of a contact surface, first deformable portions continuing from both ends of the contact surface and bent in the shape of the letter "L", second deformable portions continuing from the end portions of the first deformable portions and bent toward positions above the central portion of the contact surface-carrying portion, and contact lugs composed of locking portions and formed at the end portions of the second deformable portions, the locking portions of the contact member being movably engaged with and supported on support members.

The contact member constituting the temperature sensor according to the present invention is characterized in that it has a generally C-shaped or Ω-shaped construction and is supported on the sensor body with pins engaged from the outside at both end support portions of the contact member so that the contact member can be moved pivotally (the contact member is not in a fixed state and can be moved freely).

The contact member is a member adapted to be engaged directly with an object solid, and shaped mainly like a thin plate and, in some cases, like a metal wire, the contact member consisting of a resilient material.

This resilient material has a contact surface, a first deformable portions bent substantially in the shape of the letter "L", "J" or "C" at both ends of the contact surface, second deformable portions extended from the first deformable portions toward the inner side or center of the width of the contact surface, and support portions formed at the end portions of the second deformable portions, and a hot junction or a heat-sensitive portion is formed at the central portion of the contact surface.

This contact member is formed by using a plate of a thermocouple material, a plate of a spring material, a stainless steel plate of an increased hardness or a titanium plate. The heat-sensitive portion or a hot junction formed at the central portion of the contact surface constitutes a plate on which a hot junction of a thermocouple, a thermistor or a film type resistor of platinum is to be mounted.

In the temperature sensor according to the resent invention, it is important that means for supporting the contact member on the sensor body does not consist of a fixed means but consists of a movable means. What makes this contact member movable are pins implanted in the sensor body or locking portions thereof which work similarly to pins implanted in and formed on the sensor body, and which contact support portions formed at both end sections of the contact member, so as to bend the contact member as a whole.

BRIEF DESCRIPTION OF THE DRAWINGS

FIG. 1 is a perspective view of a principal portion of an embodiment of the surface temperature sensor according to the present invention;

FIG. 2(a) is a perspective view of one member of a sensor body, which is joined to a cylinder;

FIG. 2(b) is a perspective view of a contact member set in the sensor body;

FIGS. 6(a), 6(b), 7(a), 7(b), 8(a), and 8(b) are front elevations of the surface temperature sensor according to the present invention pressed against an object solid so that the direction of the pressing force applied to the sensor is diagonal with respect to the object surface, and plans showing the condition of the contact surface in these cases;

FIG. 9(a) is a perspective view of a second embodiment of the surface temperature sensor according to the present invention;

FIG. 9(b) is a front elevation of the embodiment of FIG. 9(a) in a supported state;

FIGS. 10(a), 10(b), 11(a), 11(b), 12(a) 12(b) are front elevations of a conventional both-end-fixed type surface temperature sensor, and plans showing the condition of the contact surface thereof in various object solid-pressing condition;

FIG. 12(c) is an enlarged view of the portion designated by a circle R in FIG. 12(a); and FIGS. 13(a), 13(b), 14(a), 14(b), 15(a) and 15(b) are views, taken to illustrate conditions in which a conventional end-fixed type surface temperature sensor undergoes deformations as it is applied at angled positions against an objective contact surface for temperature measurement, wherein FIG. 13(a) shows a front view of the sensor applied at a right angle to the objective contact surface, FIG. 13(b) being a view showing the contact surface in the case of the application of the sensor shown in FIG. 13(a), FIG. 14(a) showing a front view of the sensor applied at an inclination against the objective surface, FIG. 14(b) being a view showing the contact surface in the case of the application of the sensor shown in FIG. 14(a), FIG. 15(a) showing a front view of the sensor applied in an extremely inclined position against the objective surface, and FIG. 15(b) being a view, showing the contact surface at the time of application of the sensor shown in FIG. 15(a) and showing that the center of the contact surface is greatly deviated in this case in comparison to the condition shown in FIG. 13(a).

DESCRIPTION OF THE PREFERRED EMBODIMENTS

Figure 3A:
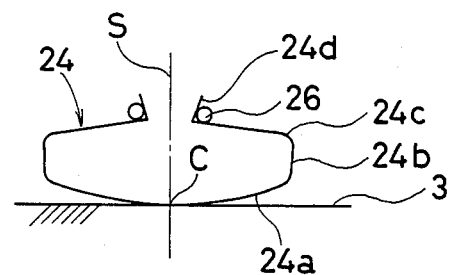
FIG. 3(a) is a front elevation showing an operation of the contact member constituting the surface temperature sensor according to the present invention.

The present invention will now be described in conjunction with the preferred embodiments, with reference to the drawings.

FIG. 1 is a perspective view of a principal portion of the temperature sensor according to the present invention. A cylinder 21 extends from a front end of a handle 20, and a two-piece sensor body 22 is fixed to the front end of the cylinder 21. An Ω-shaped or C-shaped contact member 24 is supported in a space defined by cross-sectionally semicircular guide portions 23 and 23 formed at the front end section of the sensor body 22.

The sensor body 22 consists of a molded product of a synthetic resin, a metal or a ceramic material. As shown in FIG. 2(a), each sensor body member has a semi-cylindrical shaft portion 25, contact member support portions 26 and 26 extended from both sides of the shaft portion 25 in a forward direction toward the center of the sensor body member, and a position restricting portion 27, a stepped portion 28 being formed so as to extend from space in front of the support portions 26 and 26 to space at the outer sides of the position restricting portion 27, and by the stepped portion 28, the range of movement of the contact member 24 is restricted.

FIG. 2(b) shows the sensor body 22 in which the contact member 24 is held. This contact member 24 consists of a contact surface 24a, first deformable portions 24b, second deformable portions 24c and support portions 24d, and a hot junction, or a heat-sensitive portion consisting of a thermistor is fixed to the central part of the contact surface 24a. Reference numeral 30 denotes compensating conductors or lead wires.

The contact member 24 is formed in the shape of the letter "C" or "Ω" as previously mentioned, and the corner sections of the position restricting portion 27 are positioned on the inner surfaces of the first deformable portions 24b and 24b so as to prevent the contact surface 24a from being laterally displaced. The horn-shaped support portions 26 and 26 contact the outer surfaces of the L-shaped support portions 24d and 24d, so that the contact member 24 is supported by these parts resiliently engaged therewith.

Accordingly, the main parts of the support mechanism for the contact member 24 are the support portions, or pins 26 and 26, and the position restricting portion 27 contacting the inner surfaces of the first deformable portions 24b and 24b serves as an auxiliary part for preventing the contact surface 24a from being laterally displaced. After all, the contact member 24 is supported at four points on the support portions 26 and 26 and the corner sections of the position restricting portion 27.

Figure 3B:
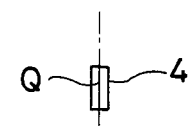
FIG. 3(b) illustrates the condition of contact surface of the contact member of FIG. 3(a)

FIGS. 3(a) and 3(b) illustrate the condition of the contact member 24 in the present invention, in which the contact member 24 is supported on the pin-type support portions 26 and 26 with the contact surface 24a engaged lightly with the object solid 3 (an illustration of the position restricting portion 27 which supports the contact member 24 auxiliarily is omitted). A comparison between this contact member of FIGS. 3(a) and 3(b) and the conventional contact member of FIGS. 10(a) and 10(b) shows that the hot junction c in each thereof is positioned in the central portion of the contact area 4. This means that the conventional temperature sensor and the temperature sensor according to the present invention are capable of detecting a temperature with an equal accuracy.

Figure 4A:
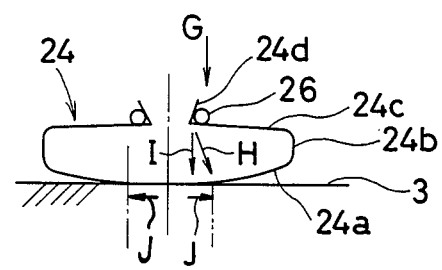
FIGS. 4(a), 4(b), 5(a) and 5(b) are front elevations of the contact member pressed in different manners, and plans showing the condition of the contact surface in these cases, in both of which cases the contact member is pressed against an object solid so that the direction of the pressing force applied to the contact member is perpendicular to the object surface.

FIG. 4(a) shows the condition of the sensor body 22 brought closer to the object solid 3. When a pressing force shown by an arrow G is applied to the support portions 24d and 24d via the pin type support portions 26 and 26, a force shown by an arrow H directed to a stress-concentrated portion Qb on the contact surface 4 shown in FIG. 4(b) occurs. The force of this arrow H consists of a force of an arrow I by which the contact member 24 is pressed against the surface of the object solid 3, and two components shown by arrows J and J, directed in the opposite directions and constituting the tensile force directed from the center of the contact member 24 to the outer sides thereof.

These components J and J directed in opposite directions constitute the tensile force applied to the contact surface 24a. Owing to the components J and J the contact surface 24a acts to pull the contact member 24 from the central portion thereof, on which the hot junction c exists, toward both corner portions thereof.

As a result, the components J and J directed toward both corner portions of the contact surface 24a work so as to further flatten the same surface, so that the contact surface 4 including the hot junction c is engaged under a higher pressure with the surface of the object solid 3.

Figure 4B:
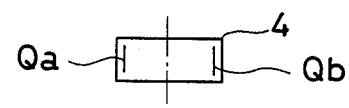

FIGS. 4(a) and 4(b) illustrate the present invention correspondingly to FIGS. 11(a) and 11(b). In the conventional contact member 1, the compressive stress due to the two components of force directed from both ends of the contact surface thereof to the central portion thereof works on the same contact surface, while, in the contact member 24 in the present invention, tensile stress consisting of the two components J and J of force directed in the opposite directions works on the contact surface thereof. It is necessary that special attention should be paid to this great difference.

Figure 5A:
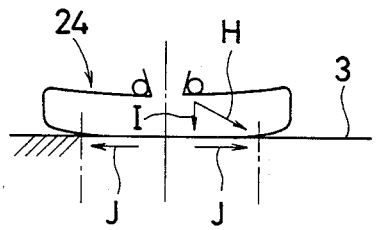
Figure 5B:
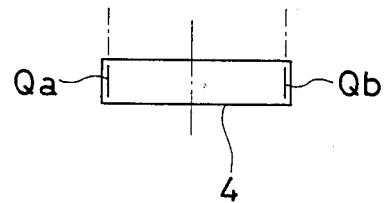

FIGS. 5(a) and 5(b) show the contact member 24 to which a pressing force is further applied, in which, in spite of the considerable deformation of the contact member 24, the contact surface 24a is wholly engaged with the object solid 3.

A comparison between the condition of deformation of the contact member of FIGS. 5(a) and 5(b) and that of the conventional contact member 1 of FIGS. 12(a) and 12(b) shows the following: In the conventional contact member 1, two components of force work thereon from both sides thereof toward the central portion thereof, so that compressive stress based on these components occurs to float the central portion of the contact surface. Consequently, the contact surface 4 is separated into to parts 4a and 4b. However, in the present invention, the area of the contact surface 4 increases accurately, and the hot junction c is positioned in the central portion of the contact surface.

When the conventional temperature sensor is in the condition shown in FIGS. 12(a) and 12(b), the temperature of an object solid cannot be measured accurately any more. On the other hand, in the temperature sensor according to the present invention, the contact surface area varies accurately in accordance with a variation of the pressing force applied to the contact member, i.e., irrespective of the magnitude of the pressing force, and the separation of the contact surface into two parts, which is encountered in the conventional temperature sensor, does not occur in this contact member. Accordingly, the temperature of an object solid can be accurately detected.

A case where the temperature sensor contacts the object solid with the direction of a pressing force applied to the sensor inclined at a large angle with respect to an object surface will now be described with reference to FIGS. 6(a), 6(b), 7(a), 7(b), 8(a) and 8(b).

FIGS. 6(a) and 6(b) are drawn correspondingly to FIGS. 13(a) and 13(b), FIGS. 7(a) and 7(b) to FIGS. 14(a) and 14(b), and FIGS. 8(a) and 8(b) to FIGS. 15(a) and 15(b). In these drawings, the temperature sensor according to the present invention in which a contact member is movably supported, and a conventional temperature sensor in which a contact member is fixedly supported are shown so that the pressed condition of the sensors, the condition of deformation of the contact members, and the relation between the contact surface areas and the positions of the hot junctions can be understood.

In the conventional temperature sensor, the hot junction c moves gradually from the central portion of the contact surface 4 to a corner portion thereof, while, in the temperature sensor according to the present invention, the hot junction c is positioned on the central portion of the contact surface irrespective of the pressed condition of the contact member.

As shown in FIGS. 7(a) and 8(a), the pin type support members 26 and 26 press the support portions 24d and 24d of the contact member 24 from the outside to support the contact member 24. Accordingly, a rotational force K occurs in these support portions, so that the first deformable portions 24b and 24b and second deformable portions 24c and 24c are not unduly deformed. Namely, these deformable portions are not greatly deformed. This may be understood clearly if FIGS. 7(a) and 8(a) are referred to FIGS. 14(a) and 15(a).

As stated above, in the sensor according to the present invention, the support portions are not fixed but they are supported on the sensor body by pin type support portions. This enables the contact surface to be engaged accurately with the surface of the object solid irrespective of the angle of the object surface-pressing direction of the sensor, i.e., not only when the direction in which the sensor is pressed against the object solid is at right angles to the surface of the object solid but also when the direction in which the sensor is pressed against the object solid is inclined with respect to the surface of the object solid. This has an important meaning. In the conventional sensor, it is necessary that the sensor be brought into contact with an object solid during a temperature-measuring operation with special attention paid to the sensor-pressing direction but, in the sensor according to the present invention, giving such consideration to the sensor-pressing direction is not required.

A second embodiment of the present invention will now be described with reference to FIGS. 9(a) and 9(b).

FIGS. 9(a) and 9(b) show a contact member 30 formed by combining crosswise the contact pieces shaped as shown in FIG. 3(a), and a hot junction c is formed on a crossing portion of these contact pieces. The portions 26a and 26a correspond to the pin type support portions 26 and 26, and the portions 26b and 26b to the position restricting portion 27 shown in FIGS. 2(a) and 2(b). These parts support the cage-like contact member 30, and prevent an unduly large deforming force from being applied thereto.

According to the present invention, the contact member is formed generally in the shape of the letter "C" or "Ω", or has a modified shape of these letters. It has a contact surface, first deformable portions extended from both sides of this contact surface, second deformable portions joined to the first deformable portions, and support portions formed at the end sections of the second deformable portions and movably supported. The parts supporting these support portions are pins. The support portions are supported on the pins so as to allow the contact member to turn therearound. Since the contact member is also supported on a position restricting portion so as to prevent the lateral displacement thereof, the following effects can be obtained.

Both end portions of the contact member are supported pivotably on the pin type support portions, so that large deformation to be caused by pressing the contact member against an object solid poses no problem.

Since the contact member has first and second deformable portions, it can be deformed sufficiently in the vertical and diagonal directions, and no local permanent deformation occurs therein.

Especially, when the temperature sensor is engaged with an object solid so that the direction of a sensor-pressing force is inclined with respect to an object surface, problems would arise. According to the present invention, the contact surface of the contact member is engaged accurately with an object surface, and, moreover, the heat-sensitive point is positioned at the central portion of the actually contacting portion of the contact surface. Accordingly, a measurement delay and measurement errors do not occur.

When the temperature sensor according to the present invention contacts a moving object or with an impact, it is rarely permanently deformed since the deformable portions thereof has a high degree of freedom of movement, though a conventional sensor of this kind is deformed at its contact surface and becomes unusable in such a case. This ensures the high durability of the sensor according to the present invention.

I claim:

1. A surface temperature sensor comprising a sensor body and a contact member formed of a resilient material and generally in the shape of the latter "C" or "Ω", said contact member including a contact surface at a central portion thereof, support portions formed adjacent the ends of said contact member so that free end sections of said support portions are opposed to each other within the width of said contact surface, and support members on which said support portions are pivotably supported on said sensor body.

2. A surface temperature sensor according to claim 1, wherein said resilient material consists of a thin heat resisting plate material, and said contact surface is provided with a heat-sensitive portion at a central section thereof.

3. A surface temperature sensor according to claim 1, wherein said contact surface is located between two end portions of said contact member and said contact member includes, first deformable portions extending from both ends of said contact surface, second deformable portions extending from both ends of said first deformable portions and bent toward the central portion of said contact surface, support portions formed between said second deformable portions and said end portions of said contact member, and pin support members engaging said support portions whereby said contact member is movably supported by said pin support members.

4. A surface temperature sensor according to claim 3, wherein inner surfaces of said first deformable portions are supported on a position restricting portion.

5. A surface temperature sensor according to claim 3, wherein said sensor body consists of two C- or Ω-shaped contact members combined so that the contact surfaces thereof are connected crosswise.

6. A surface temperature sensor according to claim 3, wherein said contact member consists of a thin plate of stainless steel, titanium or thermocouple material.

* * * * *

UNITED STATES PATENT AND TRADEMARK OFFICE
CERTIFICATE OF CORRECTION

PATENT NO. :   4,859,081
DATED      :   August 22, 1989
INVENTOR(S):   KOBAYASHI It is certified that error appears in the above-identified patent and that said Letters Patent is hereby corrected as shown below:

On the cover page, above Item [54], "Kabayashi" should read --Kobayashi--;

Item [75], "Kabayashi" should read --Kobayashi--.

Signed and Sealed this

Ninth Day of October, 1990

Attest:

HARRY F. MANBECK, JR.

*Attesting Officer*       *Commissioner of Patents and Trademarks*